OR 3,800,298

United St

Ogura et al.

[11] 3,800,298

[45] Mar. 26, 1974

[54] HOLOGRAPHY MEMORY WITH ZERO-ORDER DIFFRACTION LIGHT REMOVED

[75] Inventors: Iwao Ogura, Higashikurme; Yoshihiro Onishi, Kokubunji; Akira Arimoto, Fujisawa, all of Japan

[73] Assignee: Hitachi, Ltd., Tokyo, Japan

[22] Filed: July 28, 1972

[21] Appl. No.: 276,171

[30] Foreign Application Priority Data

July 28, 1971 Japan ................................ 46-55979

[52] U.S. Cl........ 340/173 LM, 340/173 LT, 350/3.5

[51] Int. Cl.... G11c 5/02, G11c 13/04, G02b 27/22

[58] Field of Search.... 340/173 LT, 173 LM, 173.2; 350/150, 3.5

[56] References Cited

UNITED STATES PATENTS

| | | | |
|---|---|---|---|
| 3,647,289 | 3/1972 | Weber | 350/3.5 X |
| 3,703,328 | 11/1972 | Glass | 340/173 LT |
| 3,353,894 | 11/1967 | Harris | 340/173 LT |
| 3,410,624 | 11/1968 | Schmidt | 340/173 LT |

OTHER PUBLICATIONS

Vitals, Hologram Memory for Storing Digital Data, IBM Technical Disclosure Bulletin, Vol. 8, No. 11, 4/66, pp. 1581–1583.

*Primary Examiner*—Bernard Konick
*Assistant Examiner*—Stuart Hecker
*Attorney, Agent, or Firm*—Craig and Antonelli

[57] ABSTRACT

A holography memory apparatus has parallel prisms disposed between the hologram plate and the photo-sensitive array. A light beam is diffracted at the hologram plate as a coherent light beam and is incident on the hologram plate for holographic image reconstruction and is then passed through the prism. As a result, the zero-order diffraction light pattern is removed, thus preventing it from reaching the photo-sensitive array. Hence, evidently, the photo-sensitive array can be perfectly protected from destruction attributable to the zero-order diffraction light pattern.

5 Claims, 9 Drawing Figures

3800298
OR IN 340/173LM

HOLOGRAPHY MEMORY WITH ZERO-ORDER DIFFRACTION LIGHT REMOVED

BACKGROUND OF THE INVENTION

The present invention relates to holography memory apparatus and more particularly to holography memory apparatus operable without fear of destroying the photo-sensitive array due to the zero-order diffraction light rays attendant on the light beam diffracted at the hologram plate.

DESCRIPTION OF THE PRIOR ART

Conventional holography memory apparatus involve the possibility of destroying the photo-sensitive array due to the zero-order diffraction light ray attendant on the light beam diffracted at the hologram plate. This has necessitated limitations on the number of holograms recordable on the hologram plate.

SUMMARY OF THE INVENTION

A general object of the present invention is to provide a holography memory apparatus having means for removing the zero-order diffraction light, thus allowing an arbitrary number of holograms to be recorded on the hologram plate and making a highly dense holographic recording available.

Briefly, the holography memory apparatus of this invention is characterized in that an optical prism is disposed between the hologram plate and the photo-sensitive array, whereby the foregoing zero-order diffraction light is removed.

DESCRIPTION OF THE PREFERRED EMBODIMENTS

Figure 1:
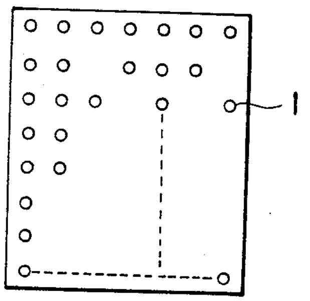
FIG. 1 PRIOR ART
FIG. 1 is a diagram schematically showing holograms arranged in a matrix form.
Figure 2:
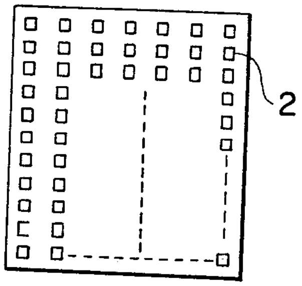
FIG. 2 PRIOR ART
FIG. 2 is a diagram schematically showing small holograms arranged in a matrix form.

One typically known holography memory apparatus is such that, as shown in FIGS. 1 and 2, digital information arranged in a matrix form is recorded on a hologram plate which comprises photosensitive elements, and holograms 2 being thus formed are disposed in matrix array.

Figure 3:
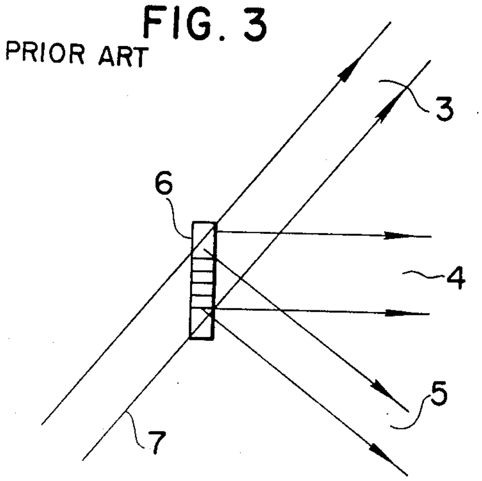
FIG. 3 PRIOR ART
FIG. 3 is a diagram useful for illustrating the behavior of light diffraction by holography.

Holography is a technique using a hologram plate comprising photo-sensitive elements, on which the interference fringes formed between the reference light beam and the object light beam, whose phase, polarized direction or amplitude has been modulated according to the input information, is recorded. The recorded information, when required, is detected and reconstructed into an image by irradiating the hologram plate with a read-out light beam. The hologram 6, as shown in FIG. 3, is a recorded interference fringe, which serves as an optical diffraction grating in the holographic read-out. Namely, the read-out light beam is split into diffraction light beams having zero-order 3, first-order 4, second-order 5, etc. The zero-order light beam 3 may be considered to propagate in a straight line, and the other order light beams at an angle to contain information. The so-called reconstruction information is contained in the first-order diffraction light 4. This light beam is detected by the photo-sensitive array and converted into an electrical signal.

Figure 4:
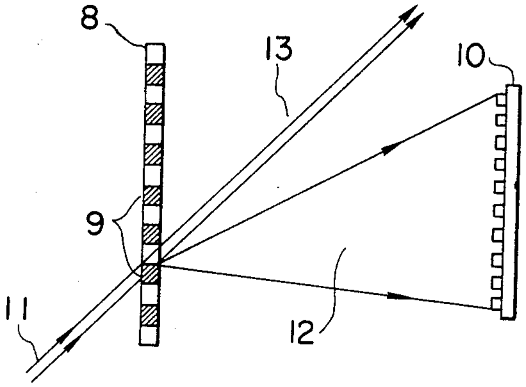
FIG. 4 PRIOR ART
FIG. 4 is a diagram schematically showing a conventional holography memory.

In holography, the zero-order diffraction light beam is usually considered as one which contains no information. For better understanding of the features and advantages of the invention, FIG. 4 shows a conventional holography memory apparatus in which the numeral reference 8 denotes a hologram plate, 9 small holograms disposed in a matrix form, and 10 a photosensitive array including a plurality of photosensitive elements arranged in a matrix array. When the recorded information is desired to be read, the hologram plate is irradiated with the read out light beam 11, whereby reconstructed information 12 is generated, which is then detected by the photo-sensitive array 10. In the art, the zero-order diffraction light beam which contains no information is arranged so as not to reach the photo-sensitive array. Where large numbers of the holograms are necessary in order to increase the memory capacity, the size of the photo-sensitive array must be increased. This may allow the zero-order diffraction light beam to reach the photo-senstive array. In another holography memory apparatus having its reconstruction information sensing positions deviated for the individual holograms, the zero-order diffraction light beam tends to reach the photo-sensitive array. In such a case, the number of holograms is inevitably limited unless the zero-order diffraction light beam is removed. This is why the over-all memory capacity has been limited. Further operation of a hologram employing a photosensitive array is given below by referring to FIG. 5.

Figure 5:
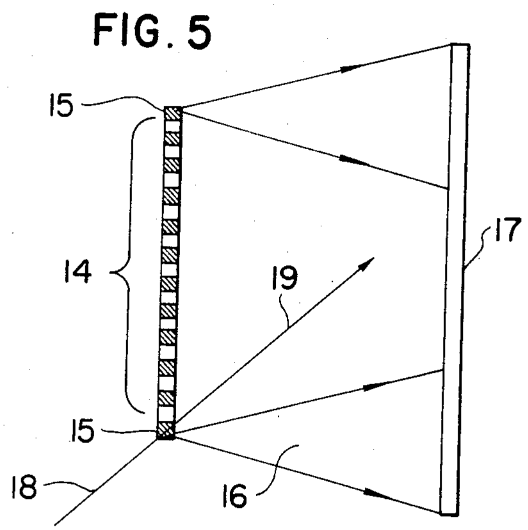
FIG. 5 is a diagram schematically showing an example of a holography memory apparatus employing a photosensitive array.

In FIG. 5, the coherent light beam 18 from a light source (not shown) is applied through a suitable optical deflector to the holograms 14, from which the diffraction light beam is taken up into different positions. These light beams are detected by the photo-sensitive array 7. In this operation it is likely to occur that the zero-order diffraction light beam 19 attendant on the diffraction light beam 16 from the small hologram 15 on the hologram plate in the lower part as in FIG. 5 hits the upper part of the photo-sensitive array 17. In such an event, the light quantity of the zero-order diffraction light beam may become more than $10^4$ times that of one bit of reconstructed information, resulting in destruction on the photo-sensitive array or may have a considerable influence on the entire memory apparatus attributable to the scattered light from the photosensitive array. This problem may be solved by limiting the number of hologram arrays to an extent where the zero-order diffraction light does not fall upon the photo-sensitive array. Such a solution, however, necessitates a limitation on the memory capacity.

Embodiment 1

Figure 6:
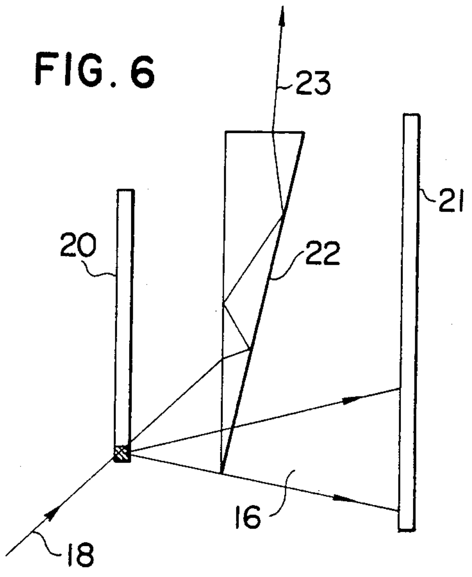
FIG. 6 is a diagram schematically showing the fundamental construction of the holography memory apparatus of this invention.

However, according to the present invention, as shown in FIG. 6, a prism 22 for removing the zero-order diffraction light beam is disposed between the hologram plate and the photo-sensitive array 21, the total reflecting function effected between the prism 22 and the media around the prism is utilized and thus, only the zero-order diffraction light 23 is removed from the diffraction light beam 18 to enable only necessary information to reach the photo-sensitive array. According to the invention, therefore, the S/N characteristics of the apparatus can be improved and the number of hologram arrays can arbitrarily be determined.

Figure 7:
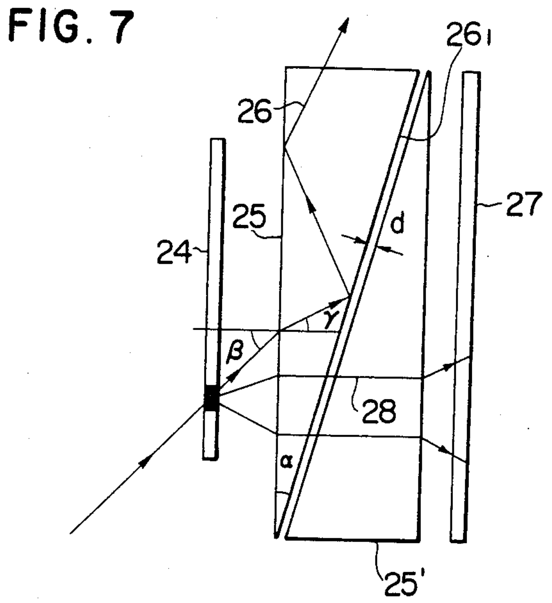
FIG. 7 is a diagram schematically showing an embodiment of the invention.

Referring to FIG. 7, there is shown an embodiment of the invention applied as in FIG. 5. In FIG. 7, two rectangular prisms 25 and 25' each having one fact at an angle $\alpha$ with the interval d therebetween are disposed between the hologram plate 24 and the photo-sensitive array 27. These prisms form a prism arrangement parallel with the hologram plate 24 and the photo-sensitive array 27. When the zero-order diffraction light beam 26 passing through the hologram is incident on the hologram at an angle $\beta$, then this angle $\beta$ has the following relationship with the refraction angle $\gamma$ at the front plane of the prism:

$\sin \beta = n \sin \alpha$, where $n$ is the index of refraction of the prism.

The angle $\alpha$ is determined to be as follows for the zero-order diffraction light beam to be totally reflected at the total reflection plate $26_1$.

$n \sin (\alpha + \beta) > 1$

When these conditions are satisfied, only the zero-order diffraction light beam is eliminated from the light beam diffracted at the hologram plate 24, thus preventing the zero-order diffraction light from reaching the photo-sensitive array 27. The photo-sensitive array is not destroyed by the zero-order diffraction light. If the zero-order diffraction light beam is divergent, it is necessary to determine the angle so that all light beams other than those having the necessary angles are removed. The reason for the use of two prisms is because these prisms, when disposed as a prism arrangement having parallel planes as shown in FIG. 7, serve to increase the productivity of the apparatus and to reduce the aberration.

Thus, by perfectly removing the zero-order diffraction light rays, the invention makes it possible to realize greater memory capacity than in the prior art. In this embodiment, it is important to suitably set the interval d to be less than the wavelength of the light beam. If not, the total reflection conditon may not be maintained to allow the zero-order diffraction light beam to pass through the prism.

Figure 8:
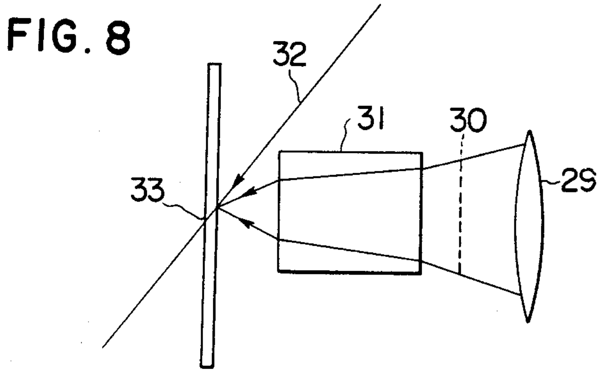
FIGS. 8 and 9 are diagrams showing other embodiments of the invention.

FIG. 8 shows an example of method for producing holograms according to the invention. In FIG. 8, the lens 29 converges the light from a light source (not shown), and the device 30 generates the foregoing object light beam. These components are not known in the art. The reference numeral 31 denotes a parallel prism arrangement as in the above embodiment, 33 a hologram plate, and 32 a reference light beam. The object light beam which has been modulated by the device 30 according to input information passes through the parallel-plane prism and is incident on the hologram plate. The interference fringes formed between the reference light beam and the light beam incident on the hologram plate are recorded as a hologram. For the reconstruction of the hologram, the foregoing read-out device is used. The purpose of the parallel-plane prism is to make the wave surface of the object light beam travel along the same path in both holographic recording and reconstruction and thus to remove the aberration involved in the reconstructed image.

In this holography memory apparatus, it is apparent that greater memory capacity can readily be attained.

Other embodiments of the invention are as follows:

Embodiment 2

Figure 9:
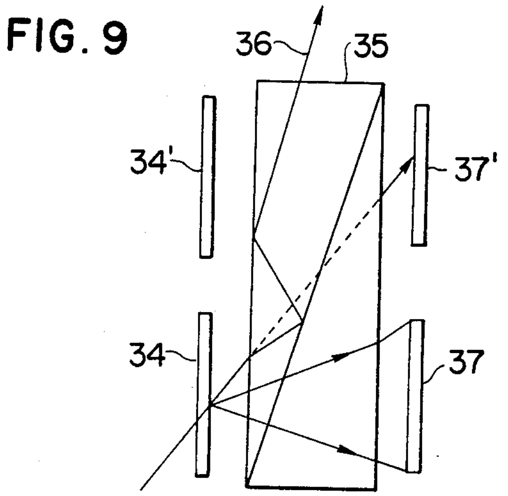

This embodiment can be applied not only to the holography memory apparatus as in FIG. 5, but also to the one as shown in FIG. 4. FIG. 9 shows an example of this embodiment, in which the reference numerals 34 and 34' denote hologram plates, 35 a prism arrangement as in the previous embodiment, and 37 and 37' photo-sensitive arrays. If this arrangement has no prism 35 arrangement, the zero-order diffraction light beam 36 from the hologram plate 34 may be incident on the photo-sensitive array 37' along the dotted line. With the prism arrangement 35, however, the zero-order diffraction light beam 36 can be removed.

Embodiment 3

In the embodiments 1 and 2, the hologram having digital information recorded and reconstructed has been described. Furthermore, according to the invention, the hologram on which an analog information or picture is recorded can be reconstructed without fear of destroying the photo-sensitive array due to the zero-order diffraction light beam.

We claim:

1. A holography memory apparatus comprising:

a. a hologram plate on which a plurality of holograms have been recorded in the form of a matrix array;

b. means for selectively illuminating a desired hologram on said hologram plate with a coherent light beam, thereby producing, from said desired hologram, diffracted light beams and a zero-order light beam;

c. a photosensitive array made up of a plurality of photosensitive elements arranged so that images corresponding to the individual holograms on said hologram plate are reconstructed at different respective positions on said photsensitive array, said array being of such an extent and positioned relative to said hologram plate so that zero-order light beams from holograms on said plate impinged by said coherent light beam strike individual ones of said photosensitive elements of said array; and d. optical prism means, disposed between said hologram plate and said photo-sensitive array, for removing the zero-order diffraction beam from the light beams diffracted from said matrix array onto said photo-sensitive array.

2. A holography memory apparatus according to claim 1, wherein said prism means comprises means for intercepting said zero-order beam and directing said zero-order beam away from said photo-sensitive array.

3. A holography memory apparatus according to claim 1, wherein said prism means is a prism arrangement for directing said zero-order beam away from said array while directing the remainder of the light, diffracted by said hologram toward said array, upon said photo-sensitive array.

4. A holography memory apparatus according to claim 3, wherein said prism arrangement comprises first and second prisms each having first and second faces forming an acute angle with respect to each other and wherein said prisms are so arranged that the respective faces thereof are parallel with each other.

5. A holography memory apparatus according to claim 4, wherein the index of refraction and said acute angle of said prisms have such values to cause said zero-order beam to be totally internally reflected within one of said prisms.

* * * * *